United States Patent [19]
Wagenseller

[11] 4,228,785
[45] Oct. 21, 1980

[54] SOLAR HEATING SYSTEM

[76] Inventor: George L. Wagenseller, 33 Inwood Rd., Levittown, Pa. 19057

[21] Appl. No.: 7,251

[22] Filed: Jan. 29, 1979

[51] Int. Cl.³ .............................................. F24J 3/02
[52] U.S. Cl. .................................. 126/422; 126/437; 237/1 R
[58] Field of Search .............. 126/422, 437, 440, 420; 237/1 R; 165/104 S, 107 R, 162

[56] References Cited
U.S. PATENT DOCUMENTS

| 4,010,734 | 3/1977 | Chayet | 126/422 |
| 4,014,314 | 3/1977 | Newton | 165/162 X |
| 4,019,495 | 4/1977 | Frazier et al. | 126/420 |
| 4,031,879 | 6/1977 | Farham | 126/437 X |
| 4,052,000 | 10/1977 | Honikman | 126/422 |
| 4,167,934 | 9/1979 | Miles | 126/422 |

*Primary Examiner*—George T. Hall
*Attorney, Agent, or Firm*—Zachary T. Wobensmith, 2nd; Zachary T. Wobensmith, III

[57] ABSTRACT

A solar heating system is provided which utilizes the suns rays to heat fluid in a solar panel, which heated fluid is released to a storage tank when it reaches a predetermined temperature, and where it is available for withdrawal from the tank for heat exchange as desired.

5 Claims, 5 Drawing Figures

SOLAR HEATING SYSTEM

BACKGROUND OF THE INVENTION

1. Field of the Invention

A solar heating system of the type wherein the sun heats up fluid in a panel with release of the fluid at a predetermined temperature for delivery to a location for storage and heat exchange.

2. Description of the Prior Art

There has been considerable interest in the development of solar heat collector panels and systems using such panels to collect heat for heating hot water and/or the interior of a building.

The amount of heat that can be collected by each panel is relatively low in any system since recovery of the sun's energy per square foot of exposed surface is low, and therefore long retention and slow passage of the liquid from the panel is desired for maximum heat absorbency. Most available solar panels and systems are expensive, and the expected savings can take many years to materialize. One example of a prior art solar panel and system is shown in the U.S. Pat. No. 4,010,734 to Chayet, which illustrates a closed system solar heater that includes a solar panel and a hot water tank with an auxiliary heater with mixing of hot and cold water in the tanks and withdrawal of cold water from the tank at the bottom for recirculation through the system. No controlled water heating and release at a predetermined temperature is even remotely suggested in Chayet.

The U.S. Pat. No. 4,014,314 to Newton, illustrates a collector panel for solar energy which includes a coiled length of tubing through which water to be heated passes. No temperature controlled retention and release of water is even remotely suggested in Newton.

The U.S. Pat. No. 4,019,495 to Frazier et al., illustrates a control system for a solar heater which includes sensing elements and comparators for activation of a circulatory pump. The structure shown in Frazier et al. is complicated and lacks many of the advantages of my structure.

The U.S. Pat. No. 4,031,879 to Parham, illustrates a solar heating plant wherein there is provided means to condense and focus solar energy on a heat exchange member which is in communication with a fluid which is heated and circulated to heat radiators. The Parham structure lacks the simplicity of my structure and is inefficient.

The U.S. Pat. No. 4,089,326 to Andrassy, illustrates a solar fluid heater with a plurality of loops of flexible plastic tubing wherein the ends of the parallel lengths of the tubing are reinforced. No structure comparable to mine is even remotely suggested in Andrassy.

None of the prior art structures suggest that simple structure of my invention with balanced controlled retention and release of the fluid for delivery for heating.

SUMMARY OF THE INVENTION

This invention relates to a solar heating system wherein fluid in a solar panel is heated by the sun to a predetermined temperature when it is released by a thermostatically controlled valve to a storage tank, with cooler fluid flowing into the panel to be heated the temperature drops closing the thermostat, and the weight of the water closing a check valve in the bottom of the panel restricting backward fluid flow thereinto.

The principal object of the invention is to provide a solar heating system which is efficient in operation.

A further object of the invention is to provide a solar heating system which is simple and inexpensive to construct, but reliable in its operation.

A further object of the invention is to provide a solar heating system which can be installed on existing or new structures.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
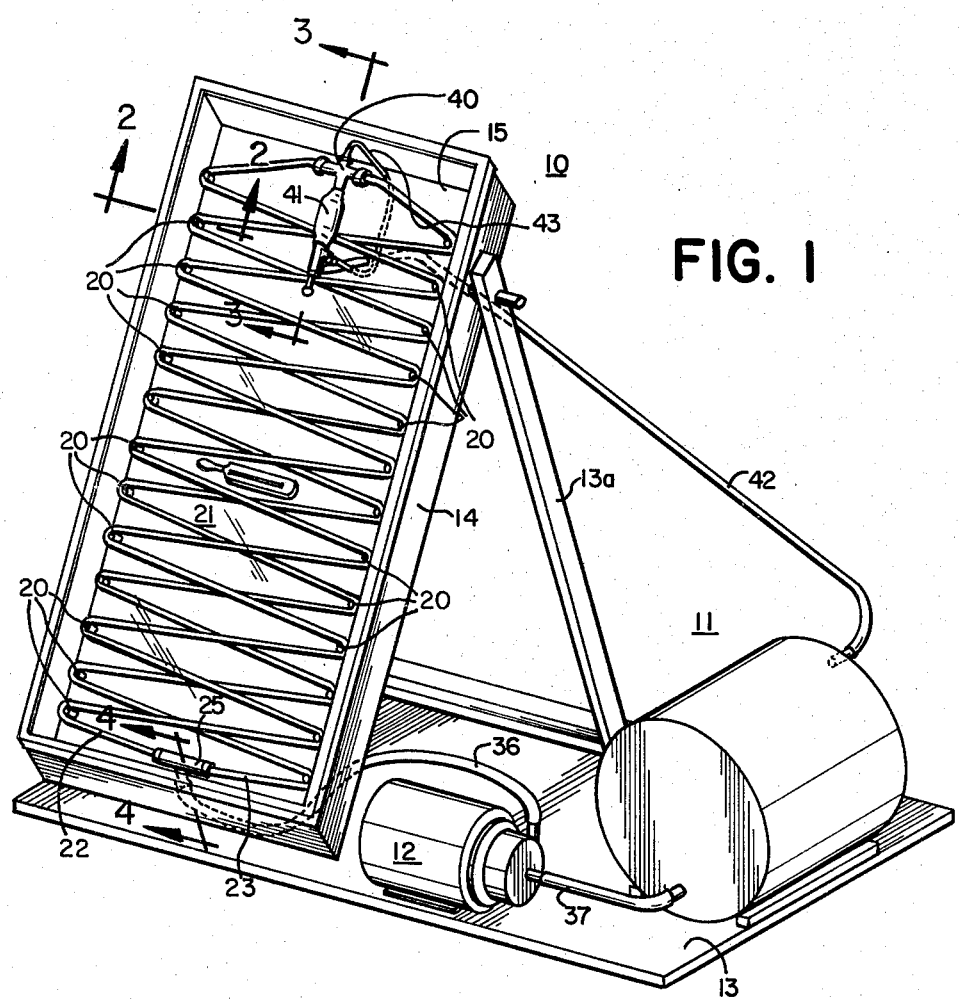
FIG. 1 is a perspective view of the solar panel and system of my invention.
Figure 2:
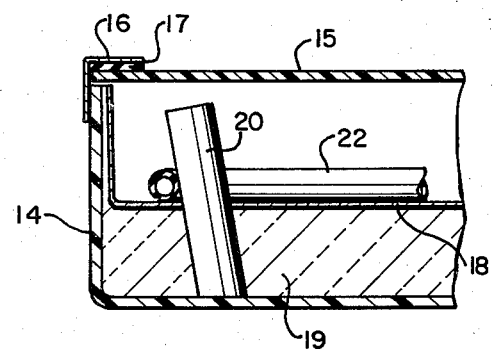
FIG. 2 is a vertical sectional view, enlarged, taken approximately on the line 2—2 of FIG. 1.
Figure 3:
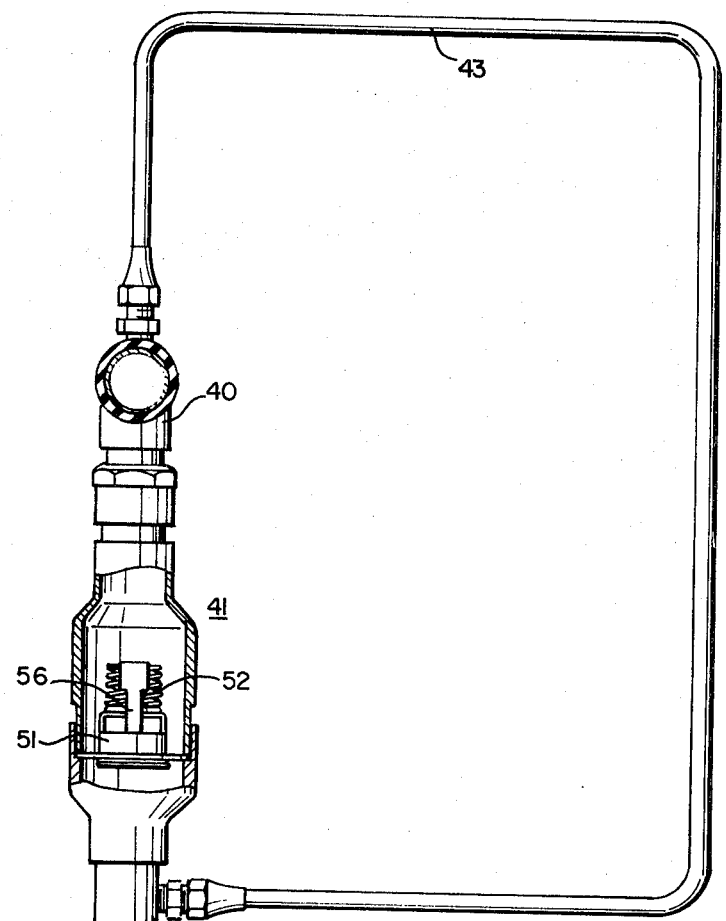
FIG. 3 is a vertical sectional view, enlarged, taken approximately on the line 3—3 of FIG. 1.
Figure 4:
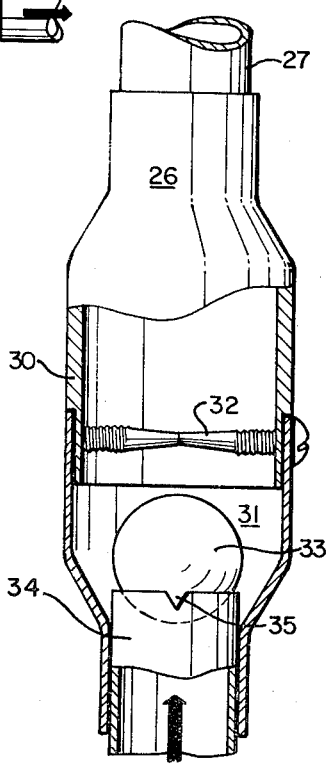
FIG. 4 is a vertical sectional view, enlarged, taken approximately on the line 4—4 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 4 thereof, a preferred embodiment is therein illustrated which includes a solar panel 10, a storage tank 11 and a circulating pump 12 all of which are shown as mounted on a platform 13. The solar panel 10 is mounted to platform 13 by legs 13a and is of generally rectangular shape with an outer box like frame 14 open at one side and which is covered by a sheet of plate glass or transparent plastic 15 which is retained thereto by an outer molding 16 and with a rubber gasket 17 therebetween. The frame 14 is preferably formed of fiber glass with a black colored heat absorber sheet 18 therein extending from side to side and preferably formed of aluminum with insulation material 19 between it and frame 14 and with a plurality of pegs 20 around the perimeter.

Pipe 21 which is preferably formed of plastic is provided, is wound around the pegs 20 from side to side in overlapped relationship and may be of two pieces 22 and 23. The pipe pieces 22 and 23 as shown in FIG. 1 are detachably connected at the bottom of panel 10 to an inlet T fitting 25.

The T fitting 25 is attached to a check valve 26 by a length of pipe 27.

The check valve 26 includes an outer shell 30 which is of two piece cylindrical configuration with a member 32 extending across the shell 30. A ball 33 is provided in the central section 31 which normally seats on a length of pipe 34, which extends up into the central section 31 and which includes a V-shaped notch 35 therein to permit a slight amount of backflow when the ball 33 is seated on pipe 34, and which ball 33 is restricted in its upward movement by member 32.

The pipe 34 is connected to one side of the circulating pump 12 by a pipe 36 which pump is connected to tank 11 at the bottom by pipe 37.

The pipes 22 and 23 are detachably connected at the top of panel 10 to a T-shaped fitting 40 which is connected to a thermostatically controlled discharge valve member 41 which has a pipe 42 connecting it to storage tank 11.

A bypass pipe 43 is connected to the top of the T fitting 40 and to the bottom of the valve 41 before the pipe 42, to provide for venting of the system if necessary. A thermometer 45 is also provided connected to the valve member 41 for visual determination of the temperature of the fluid in valve 41.

The thermostatically controlled valve 41 of well known type includes a valve stem 50 normally urged into contact with valve seat 51 by a bellows 52 attached thereto sensitive to temperature change and which in the preferred embodiment moves valve stem 50 out of contact with seat 51 when the fluid in member 41 reaches a temperature of 160° F. and remains open until the fluid temperature drops to 140° F.

Figure 5:
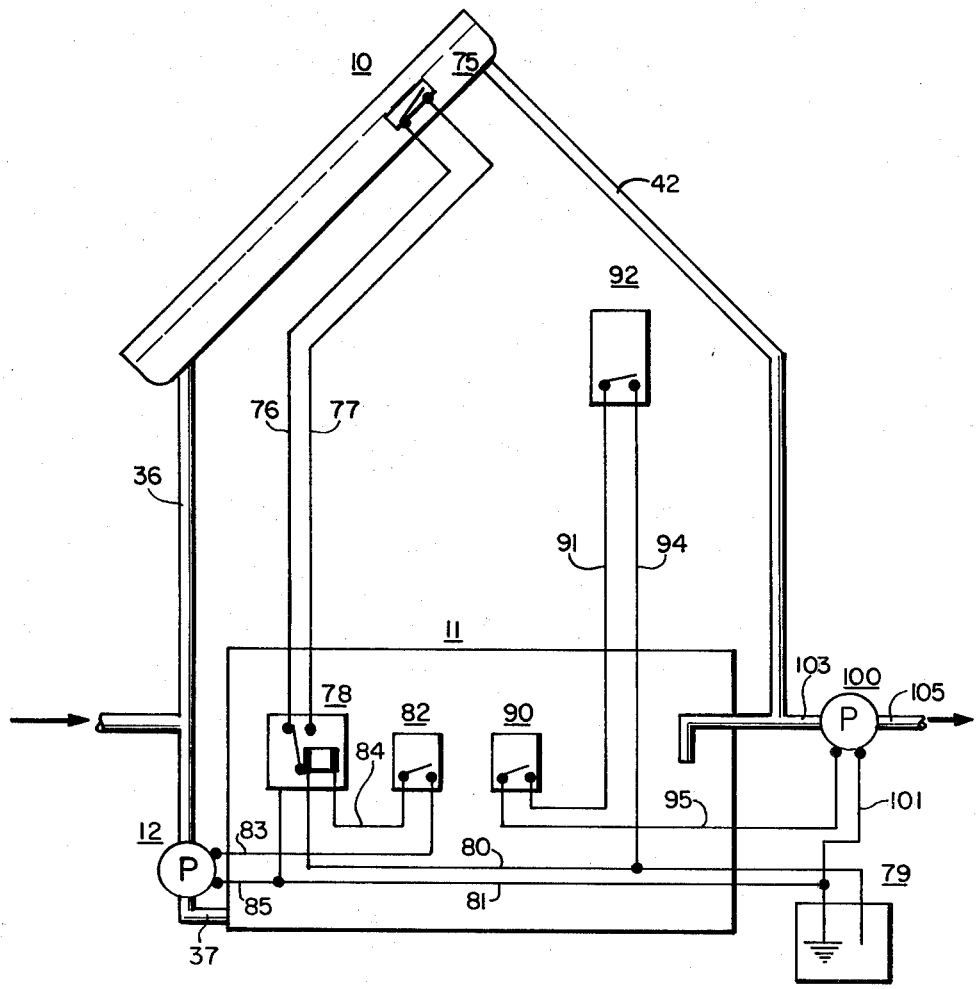
FIG. 5 is a diagrammatic view of the circuitry employed with the invention.

The control circuitry is more fully illustrated in FIG. 5 and is shown for a typical home environment.

The circuitry includes a low voltage control thermostat 75 which can be placed in the panel 10 and connected by wires 76 and 77 to one side of a relay 78. The relay 78 is connected to a junction box 79 by wires 80 and 81 which box 79 is connected to a source of electrical energy (not shown).

A wire 84 is connected to the relay 78 and to a high limit immersion control 82 in tank 11 which has a wire 83 connected to the circulating pump 12.

The circulating pump 12 is connected by another wire 85 to the wire 81 to the junction box 79.

A reverse aquastat control 90 is also provided in tank 11 connected by a wire 91 to a room thermostat 92 which is connected to the junction box 79 by wire 94. Another wire 95 connects the control 90 to a heating circulating pump 100 which is connected by wire 101 to junction box 79. In FIG. 5 the pipe 42 to the tank 11 also has a pipe 103 connected thereto and to the circulating pump 100 which has an outlet pipe 105 connected for delivery of liquid for heating a space such as a room or a house.

The mode of operation will now be pointed out. With the panel 10 filled with water from tank 11, which is to be heated, the sun's rays directed on sheet 18 in the enclosed panel 10 cause the water in pipes 22 and 23 to be heated. When the temperature of the water in pipes 22 and 23 reaches a predetermined value, such as 140° F., the valve stem 50 is moved away from the seat 51 and water flows out pipe 42 into tanks 11. If desired with the house temperature acting on thermostat 92 heating circulating pump 100 is actuated to circulate heated water through pipe 105 into the house (not shown) for heating.

The thermostat 75 in the panel 10 actuates the circulating pump 12 to pump cold water from tank 11 through pipe 36 to check valve 26 and into pipes 22 and 23 until they are full and valve member 41 closed. The ball 33 seats on the pipe 34 preventing backflow of water and the pump 12 will continue to run until thermostat 75 senses a drop of temperature below 140° F. or the high limit control 82 reaches its limit. The cycle is repeated as required and the heated water stored in tank 11 for delivery as needed.

I claim:

1. A solar heating system which comprises
    a solar panel open at one side,
    a transparent cover closing said open side,
    a pipe system in said panel for liquid circulation therethrough and having inlet and discharge ends,
    a temperature responsive control valve in said panel connected to said pipes and controlling liquid delivery from said pipe system at a predetermined temperature level,
    a storage tank for receiving liquid from said valve,
    a circulating pump interposed between said tank and said pipes for return of liquid thereto,
    a check valve between said pump and said pipes,
    a pipe connecting said check valve to said pump, and
    temperature responsive control means responsive to the temperature in said panel for controlling the operation of said pump.

2. A solar heating system as defined in claim 1 in which
    said temperature responsive control valve is located at the discharge end of said pipes.

3. A solar heating system as defined in claim 2 in which
    said temperature responsive control valve is effective to shut off at a predetermined temperature level lower than the temperature level at which it opens.

4. A solar heating system as defined in claim 1 in which
    said storage tank has an additional liquid discharge connection communicating therewith,
    said discharge connection has a pump connected thereto for delivery of heated liquid for use.

5. A solar heating system as defined in claim 4 in which
    temperature responsive control means responsive to a selected condition is provided for controlling said last mentioned pump.

* * * * *